June 12, 1928.

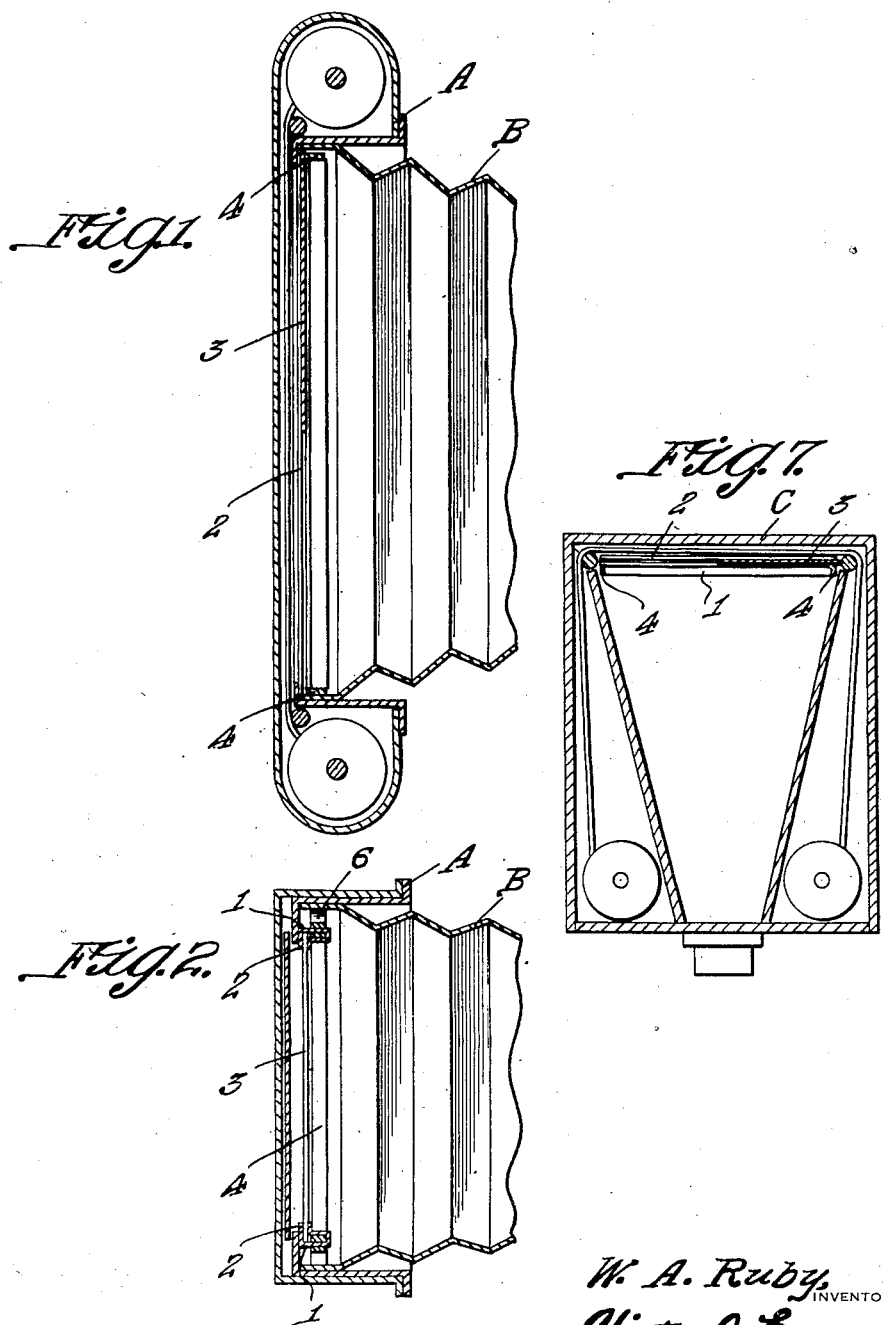

W. A. RUBY 1,673,641

MULTIPLE EXPOSURE ATTACHMENT FOR CAMERAS

Filed Aug. 6, 1927  2 Sheets-Sheet 2

W. A. Ruby, INVENTOR

BY Victor J. Evans ATTORNEY

Patented June 12, 1928.

1,673,641

UNITED STATES PATENT OFFICE.

WILLIAM ARTHUR RUBY, OF LOS ANGELES, CALIFORNIA.

MULTIPLE-EXPOSURE ATTACHMENT FOR CAMERAS.

Application filed August 6, 1927. Serial No. 211,183.

This invention relates to photography, and its general object is to provide an attachment for roll film cameras and the like that will enable the camera to make more than one exposure side by side on a single film of the roll, with the result a greater number of pictures can be taken with a single roll of films and different views will be arranged on a single print, therefore, the expense of taking pictures will be reduced by my device as well as the fact that related views will be kept together.

Another object of the invention is to provide a multiple exposure attachment for cameras, that can be associated with any type and make of camera in an easy and expeditious manner and said attachment is extremely simple and inexpensive to manufacture.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a fragmentary sectional view taken through a folding camera of the roll film receiving type and showing the application of my attachment thereto.

Figure 2 is a horizontal sectional view taken through the camera and attachment as shown in Figure 1.

Figure 7 is a vertical sectional view taken through a box camera and showing the application of my device thereto.

Figure 3:
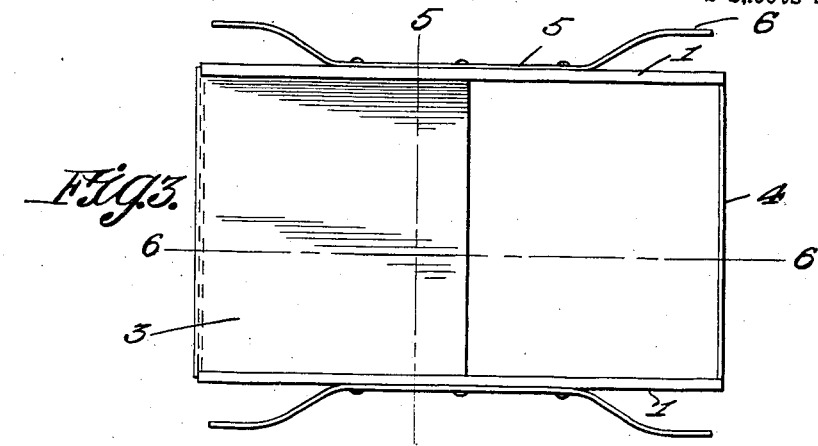
Figure 3 is a view of the attachment per se with the mask thereof disposed in one position.

Referring to the drawings in detail the letter A indicates a fragmentary portion of a folding camera of the roll film receiving type and B the bellows thereof.

Figure 4:
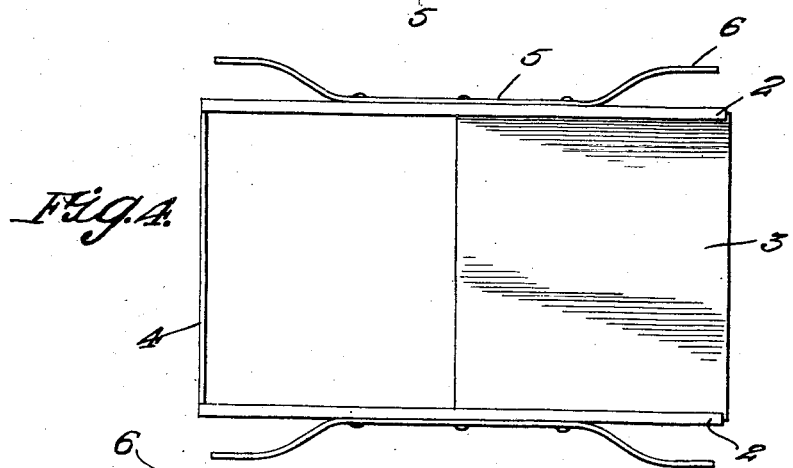
Figure 4 is a similar view with the mask disposed in its other position.
Figure 5:
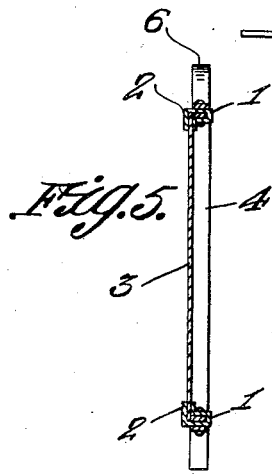
Figure 5 is a sectional view taken on line 5—5 of Figure 3.
Figure 6:
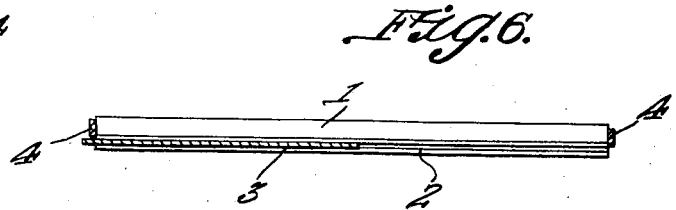
Figure 6 is a sectional view taken on line 6—6 of Figure 3.

The attachment which forms the subject matter of the present invention includes a rectangular frame which of course is constructed to fit the camera to which it is to be attached, and said frame includes parallel longitudinally disposed guide bars 1 which are provided with guide flanges 2 having mounted therein for slidable movement a plate 3 which in fact is a mask and is adapted to be shifted from one side of the frame to the other under the action of gravity when the camera is tilted accordingly and as suggested in Figures 3 and 4 of the drawings. The frame also includes end bars 4 which are integrally formed with the guide bars or otherwise secured thereto.

Secured to the outer surfaces of the guide bars 1 are resilient strips 5 which terminate in spring fingers 6 disposed in spaced relation to the bars as shown, and these spring fingers are adapted for the purpose of fixing the frame in the camera as will be readily apparent upon inspection of Figures 1, 2, and 7 and as illustrated in Figures 1 and 2, the frame is disposed in the interior of the removable compartment of this camera and engages the inner flange thereof with the spring fingers disposed in contacting engagement with the inner fold of the bellows with the result, the frame and its mask is arranged in close association with the film which of course is slightly spaced from the flange through the instrumentality of the film rollers as shown.

In Figure 7, I have illustrated the application of my attachment to a box camera and when arranged in this type of camera, the spring fingers will engage the longitudinal walls of the inner compartment C of the camera as shown and the frame and its mask will likewise be disposed in close association with the film, so that the mask will prevent exposure of any part of the film covered thereby.

From the above description and disclosure of the drawings, it will be obvious that when the device is placed in a camera as shown and described, that due to the fact that the plate 3 or mask is disposed for slidable movement in the frame, it can be arranged upon either side of the frame and therefore cover one side portion of the film while the other side portion is being exposed, with the result that two views can be taken on a single sheet of film. In order to provide a space between the views, the plate or mask is of a size so that it will extend a fraction over the center of the film and leave a margin between the views. Of course, the plate or mask engages the side walls of the compartment within which it is secured so as to prevent light from escaping between the wall and the plate or mask.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An attachment for cameras comprising a frame, guide flanges included in said frame, a mask mounted for slidable movement in said guide flanges and being movable under the action of gravity and spring fingers secured to said frame for securing said frame in a camera.

2. An attachment for cameras comprising a frame, guide bars included in said frame, end bars secured to said guide bars, spaced flanges providing guides and being formed with said guide bars, a plate mounted for slidable movement in the said flanges so as to cover a portion of an exposed film to prevent exposure of said covered portion, strips secured to said guide bars and terminating in spring fingers adapted to secure said frame in a camera.

3. An attachment for cameras comprising a frame constructed to fit the inner compartment of a camera, guide bars included in said frame, guide flanges formed with said guide bars, end bars secured to said guide bars, spring fingers secured to said guide bars for detachably fixing said frame in the inner compartment, and a mask mounted for slidable movement in the guide flanges as and for the purpose specified.

In testimony whereof I affix my signature.

WILLIAM ARTHUR RUBY.